(12) United States Patent
Ye et al.

(10) Patent No.: US 9,104,417 B2
(45) Date of Patent: Aug. 11, 2015

(54) ELECTRONIC APPARATUS CAPABLE OF BEING WAKED UP THROUGH DETECTING MOTIONS

(71) Applicant: Cywee Group Limited, Road Town, Tortola (VG)

(72) Inventors: Zhou Ye, Foster City, CA (US); Shun-Nan Liou, Kaohsiung (TW); Chin-Lung Lee, Taoyuan County (TW)

(73) Assignee: Cywee Group Limited, Road Town Tortola (VG)

( * ) Notice: Subject to any disclaimer, the term of this patent is extended or adjusted under 35 U.S.C. 154(b) by 0 days.

(21) Appl. No.: 14/033,553

(22) Filed: Sep. 23, 2013

(65) Prior Publication Data

US 2014/0337651 A1  Nov. 13, 2014

(30) Foreign Application Priority Data

May 8, 2013  (CN) ...................... 2013 2 0245496 U

(51) Int. Cl.
*G06F 3/00* (2006.01)
*G06F 1/00* (2006.01)
*G06F 1/32* (2006.01)

(52) U.S. Cl.
CPC .............. *G06F 1/3243* (2013.01); *G06F 1/325* (2013.01); *G06F 1/3215* (2013.01)

(58) Field of Classification Search
CPC ...... G06F 1/3215; G06F 1/3243; G06F 1/325
See application file for complete search history.

(56) References Cited

U.S. PATENT DOCUMENTS

| | | | | |
|---|---|---|---|---|
| 4,965,550 | A * | 10/1990 | Wroblewski | 340/524 |
| 5,355,503 | A * | 10/1994 | Soffel et al. | 713/322 |
| 6,256,746 | B1 * | 7/2001 | Cheng | 713/600 |
| 6,557,107 | B1 * | 4/2003 | Kim | 713/320 |
| 2011/0109330 | A1 * | 5/2011 | Ikuta et al. | 324/686 |
| 2014/0136871 | A1 * | 5/2014 | Jung et al. | 713/323 |

* cited by examiner

*Primary Examiner* — Jing-Yih Shyu
(74) *Attorney, Agent, or Firm* — Alan D. Kamrath; Kamrath IP Lawfirm, P.A.

(57) ABSTRACT

An electronic apparatus including a plurality of sensors, an application processor, and a micro-processor is provided. The plurality of sensors is configured to generate at least one sensing signal. The application processor is configured to execute an application procedure according to a sensing-merged signal. The micro-processor is coupled between the plurality of sensors and the application processor, and is configured to generate the sensing-merged signal according to the at least one sensing signal. By utilizing the electronic apparatus, not only power can be saved, but also the elasticity for choosing sensor chip vendors can be improved.

7 Claims, 2 Drawing Sheets

ELECTRONIC APPARATUS CAPABLE OF BEING WAKED UP THROUGH DETECTING MOTIONS

FIELD OF THE INVENTION

The present invention provides an electronic apparatus, and more particularly to an electronic apparatus having a separate micro-processor as a communication bridge between sensors and an application processor.

BACKGROUND OF THE INVENTION

Electronic apparatuses, such as a mobile phone, a tablet PC, a PDA, have gradually become popular in human life. In order to save power, an application processor of a common electronic apparatus will set some predetermined conditions to get into a sleep mode. For example, after the electronic apparatus is idle for a period of time, the application processor of the electronic apparatus can get into the sleep mode. When the application processor gets into the sleep mode, the display module (such as a display panel or a touch panel) of the electronic apparatus will be turned off, or the input module will be turned off in order to save power. However, the disadvantage of such configuration is that: a user cannot use finger(s) to slide on the touch panel so as to make the application processor and the mobile phone leave the sleep mode; and the user needs to press a physical button to wake up the application processor in order to enable the touch panel, and thus the user can use finger(s) to slide on the touch panel to unlock the electronic apparatus in order to leave the sleep model, which makes the user inconvenient. Moreover, the application processor can process sensing signals only when it is in a wake-up status. That is to say, the application processor always needs to stay in the wake-up status in order to process sensing signals, which will waste more power consumption.

SUMMARY OF THE INVENTION

It is one of the objectives of the present invention to provide an electronic apparatus to solve the abovementioned problems raised in the prior art, such as inconvenient operations and huge power consumption.

According to one aspect of the present invention, an electronic apparatus including a plurality of sensors, an application processor, and a micro-processor is provided. The plurality of sensors is configured to generate at least one sensing signal. The application processor is configured to execute an application procedure according to a sensing-merged signal. The micro-processor is coupled between the plurality of sensors and the application processor, and is configured to generate the sensing-merged signal according to the at least one sensing signal.

In a preferred embodiment of the electronic apparatus of the present invention, the plurality of sensors includes an accelerometer, and the sensing signal generated by the accelerometer is used for controlling, enabling and disabling of the micro-processor. In a preferred embodiment of the electronic apparatus of the present invention, when the micro-processor detects that the sensing signal generated by the accelerometer is at high level, the micro-processor is enabled and is configured to compute the sensing signal according to an algorithm so as to generate the sensing-merged signal.

In a preferred embodiment of the electronic apparatus of the present invention, the micro-processor is independent with at least one of the plurality of sensors, and they are not packed in a single chip.

In a preferred embodiment of the electronic apparatus of the present invention, the micro-processor is independent with the application processor, and they are not packed in a single chip.

In a preferred embodiment of the electronic apparatus of the present invention, a computing ability of the application processor is greater than a computing ability of the micro-processor.

By utilizing the electronic apparatus of the present invention, not only operations become more convenient and power can be saved, but also the elasticity for choosing sensor chip vendors can be improved.

These and other objectives of the present invention will no doubt become obvious to those of ordinary skill in the art after reading the following detailed description of the preferred embodiment that is illustrated in the various figures and drawings.

DETAILED DESCRIPTION OF PREFERRED EMBODIMENTS

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
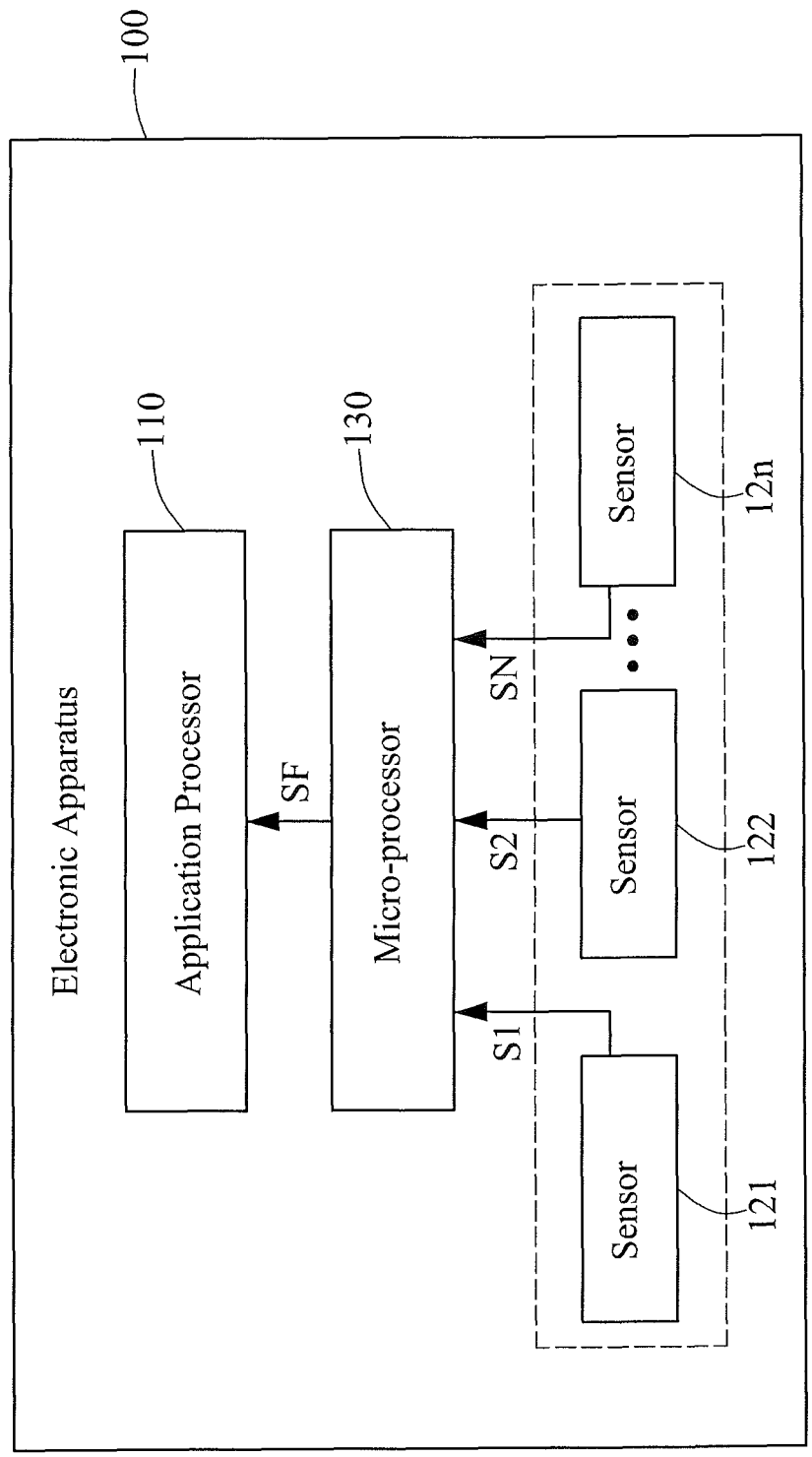
FIG. 1 is a diagram showing an electronic apparatus according to a first embodiment of the present invention.

Please refer to FIG. 1. FIG. 1 is a diagram showing an electronic apparatus 100 according to a first embodiment of the present invention. The electronic apparatus 100 can be a mobile phone, a tablet PC, a PDA, etc. The electronic apparatus 100 may include, but is not limited to, an application processor 110, a plurality of sensors 121-12$n$, and a micro-processor 130. The plurality of sensors 121-12$n$ is configured to generate at least one sensing signal(s) S1-SN. The application processor 110 is configured to execute an application procedure according to a sensing-merged signal SF. The micro-processor 130 is coupled between the plurality of sensors 121-12$n$ and the application processor 110, and is configured to generate the sensing-merged signal SF according to the at least one sensing signal(s) S1-SN.

The plurality of sensors 121-12$n$ mentioned above can be implemented by an accelerometer, a rotation sensor, a magnetometer, and/or an altimeter, however, this should not be a limitation of the present invention. In addition, please note that, a computing ability of the application processor 110 is greater than a computing ability of the micro-processor 130. For example, the application processor 110 may be a multi-core baseband processor of a mobile phone, and the micro-processor 130 may be a single chip microcontroller. Those skilled in the art should understand the difference(s) between the application processor 110 and the micro-processor 130 easily, and thus further description is omitted here for brevity.

Please be noted that, when the application processor 110 of the electronic apparatus 100 of the present invention gets into a sleep mode, the micro-processor 130 is still working so as to maintain fundamental functions of the electronic apparatus 100. As a result, even if the handheld electronic apparatus 100 gets into the sleep mode, the application processor 110 can be waked up through detecting motions of the electronic apparatus 100. For example, when the application processor 110 gets into the sleep mode, the application processor 110 turns off a display module (not shown) of the electronic apparatus 100, and locks a touch panel (not shown) of the electronic apparatus 100. The locking mechanism of the electronic apparatus 100 of the present invention is listed below. Step (1): a user swings the electronic apparatus 100, and motions and/or rotations of the electronic apparatus 100 are detected by the plurality of sensors 121-12n so as to generate sensing signals S1-Sn; step (2) the sensing-merged signal SF, which can be used for waking up the application processor 110, is then generated by the micro-processor 130 according to the sensing signals S1-Sn; and step (3) the application processor 110 receives the sensing-merged signal SF and then executes an application procedure according to the sensing-merged signal SF. For example, the application processor 110 may compare the sensing-merged signal SF to see whether it corresponds to a specific gesture or not; and if the sensing-merged signal SF corresponds to the specific gesture, the abovementioned display module will be enabled and enter an unlocked status automatically. Therefore, the electronic apparatus 100 no need to have a physical button as the prior art, and the user no need to press the physical button so as to unlock the electronic apparatus 100. In addition, when the display module of the electronic apparatus 100 is turned off, the application processor 110 can continue to play back music. The electronic apparatus 100 of the present invention can generate motion data through detecting motions and/or rotations according to the plurality of sensors 121-12n when the user swings the electronic apparatus 100; and the micro-processor 130 can process the motion data and then the application processor 110 can control the played music. For example, the user can beat the left side of the electronic apparatus 100 so as to select to play back a previous song, or beat the right side of the electronic apparatus 100 so as to select to play back a next song.

On the other hand, another advantage of the present invention is that: the function of the counter can still work after the application processor 110 gets into the sleep mode. For example, when the application processor 110 gets into the sleep mode and the electronic apparatus 100 uses the function of the counter, the sensor 121 (such as an accelerometer) can generate the at least one sensing signal S1. The micro-processor 130 can generate a counting information according to the at least one sensing signal S1 generated by the accelerometer. Please note that, in another embodiment of the present invention, the micro-processor 130 can set a default counting information, such as 1000 counts. That is to say, when the counting information is up to 1000 counts, the micro-processor 130 can wake up the application processor 110 by using the sensing-merged signal SF.

Figure 2:
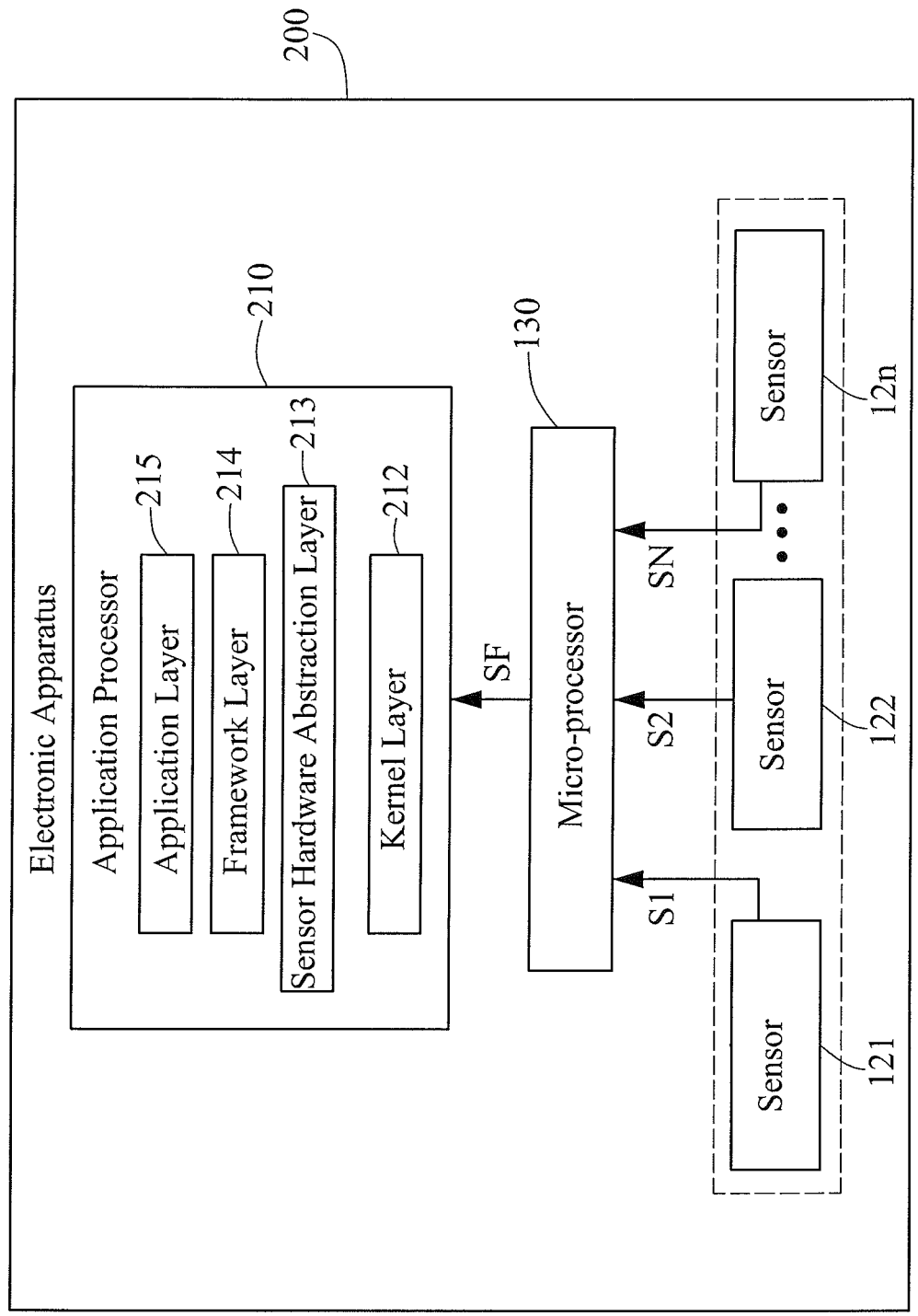
FIG. 2 is a diagram showing an electronic apparatus according to a second embodiment of the present invention.

Please refer to FIG. 2. FIG. 2 is a diagram showing an electronic apparatus 200 according to a second embodiment of the present invention. The electronic apparatus 200 may include an application processor 210, a micro-processor 130, and a plurality of sensors 121-12n. The plurality of sensors 121-12n mentioned above can be implemented by an accelerometer, a rotation sensor, a magnetometer, and/or an altimeter. The application processor 210 may include a Kernel layer 212, a sensor hardware abstraction layer (sensor HAL) 213, a framework layer 214, and an application layer 215, wherein the application layer 215 can be Android System's application layer. The micro-processor 130 is disposed between the application processor 210 and the plurality of sensors 121-12n. The plurality of sensors 121-12n will generate corresponding sensing signals S1-SN after sensing, and will transmit the sensing signals S1-SN to the micro-processor 130. The micro-processor 130 merges the sensing signals S1-SN generated by the plurality of sensors 121-12n and then transmits a sensing-merged signal SF to the application processor 210. The application processor 210 executes a corresponding application procedure according to the sensing-merged signal SF. Please be noted that, the communication between the application processor 210 and the micro-processor 130 is implemented by an internal integrated circuited port; and the communication between the micro-processor 130 and the plurality of sensors is implemented by an internal integrated circuited port; however, this should not be a limitation of the present invention.

The electronic apparatus 100/200 is characterized in that: the micro-processor 130 can be selectively enabled or disabled to save power. For example, the plurality of sensors 121-12n may include an accelerometer, and the sensing signal generated by the accelerometer can be used for controlling, enabling and disabling of the micro-processor 130. In more details, when the accelerometer generates an acceleration-related sensing signal, it represents that the electronic apparatus 100/200 is moving (for example, the sensing signal can be at a high level at this time) so as to enable the micro-processor 130. After the micro-processor 130 is enabled, it can merge the sensing signals S1-SN generated by the plurality of sensors 121-12n to generate a sensing-merged signal SF according to an algorithm. The sensing-merged signal SF is then transmitted from the micro-processor 130 to the application processor 110/210 in order to let the application processor 110/210 execute the corresponding application procedure.

The advantage of the configuration of the present invention is that: determining whether to enable the micro-processor 130 to save power by using characteristics of the plurality of sensors. For example, in the abovementioned embodiment, it can determine whether to enable the micro-processor 130 by adopting the accelerometer sensor. In other words, the electronic apparatus 100/200 with such configuration can determine whether to enable the application processor 110/210 to execute the corresponding application procedure to save power based on the motion detection itself.

Please be noted that, in one embodiment of the electronic apparatus 100/200 of the present invention, the micro-processor 130 and at least one of the plurality of sensors 121-12n are not packed in a single chip, however, this should not be a limitation of the present invention. Some of the plurality of sensors 121-12n can be packed in a single chip. Furthermore, the micro-processor 130 is independent with the application processor 110/210, and they are not packed in a single chip. Please note that, driver programs of the plurality of sensors 121-12n can be preloaded into the micro-processor 130. Therefore, if a developer adopts the micro-processor 130 of the present invention, the sensing signals S1-SN of the plurality of sensors 121-12n can be successfully processed. The advantage of the configuration of the present invention is that: the elasticity for choosing sensor chip vendors can be improved.

Those skilled in the art will readily observe that numerous modifications and alterations of the device and method may be made while retaining the teachings of the present invention.

What is claimed is:

1. An electronic apparatus capable of being waked up through detecting motions, comprising:

a plurality of sensors configured to generate at least one sensing signal, wherein the plurality of sensors comprises an accelerometer;

an application processor configured to execute an application procedure according to a sensing-merged signal;

a micro-processor coupled between the plurality of sensors and the application processor, wherein the at least one sensing signal generated by the accelerometer is used for controlling, enabling and disabling of the micro-processor, wherein the micro-processor is configured to generate the sensing-merged signal according to the at least one sensing signal, wherein when the micro-processor detects that the at least one sensing signal generated by the accelerometer is at high level, the micro-processor is enabled and is configured to compute the at least one sensing signal according to an algorithm to generate the sensing-merged signal; and a display module, wherein the application processor in a sleep mode turns off the display module;

wherein the micro-processor generates the sensing-merged signal for waking up the application processor from the sleep mode, wherein the application processor compares the sensing-merged signal to see whether the sensing-merged signal corresponds to a specific gesture or not while the display module is turned off; and wherein under a condition that the sensing-merged signal corresponds to the specific gesture, the display module is enabled and enters an unlocked status automatically.

2. The electronic apparatus as claimed in claim 1, wherein driver programs of the plurality of sensors are preloaded into the micro-processor.

3. The electronic apparatus as claimed in claim 1, wherein the micro-processor is independent with at least one of the plurality of sensors, and they are not packed in a single chip.

4. The electronic apparatus as claimed in claim 1, wherein the micro-processor is independent with the application processor, and they are not packed in a single chip.

5. The electronic apparatus as claimed in claim 1, wherein a computing ability of the application processor is greater than a computing ability of the micro-processor.

6. The electronic apparatus as claimed in claim 1, wherein the application processor comprises a Kernel layer, a sensor hardware abstraction layer, a framework layer, and an application layer.

7. The electronic apparatus as claimed in claim 1, wherein the communication between the application processor and the micro-processor is implemented by an internal integrated circuited port; and the communication between the micro-processor and the plurality of sensors is implemented by an internal integrated circuited port.

* * * * *